United States Patent [19]
Ellis et al.

[11] Patent Number: 5,803,405
[45] Date of Patent: Sep. 8, 1998

[54] EXPANDABLE AIRCRAFT SECTION

[75] Inventors: James R. Ellis, Carrollton; Joseph B. Diller, Hurst, both of Tex.

[73] Assignee: Northrop Grumman Corporation, Los Angeles, Calif.

[21] Appl. No.: 484,127

[22] Filed: Jun. 7, 1995

[51] Int. Cl.$^6$ ............................... B64C 1/30; B64C 1/38
[52] U.S. Cl. .................. 244/130; 244/118.1; 244/129.5; 244/218
[58] Field of Search ............................ 244/129.4, 129.5, 244/130, 118.1, 119, 218

[56] References Cited

U.S. PATENT DOCUMENTS

| | | | |
|---|---|---|---|
| 821,398 | 5/1906 | Wright et al. . | |
| 1,341,758 | 6/1920 | Parker . | |
| 1,365,346 | 1/1921 | Schenkel . | |
| 2,152,029 | 3/1939 | Cone . | |
| 2,329,133 | 9/1943 | Peed, Jr. . | |
| 2,368,702 | 2/1945 | Bourne | 244/130 |
| 2,749,064 | 6/1956 | Kuhlman, Jr. | 244/130 |
| 2,754,904 | 7/1956 | Provenzano | 244/129.5 |
| 2,973,170 | 2/1961 | Rodman . | |
| 2,979,287 | 4/1961 | Ross . | |
| 3,037,723 | 6/1962 | Taylor | 244/129.5 |
| 3,118,639 | 1/1964 | Kiceniuk . | |
| 3,174,712 | 3/1965 | Ricard | 244/129 |
| 3,179,357 | 4/1965 | Lyon . | |
| 3,432,125 | 3/1969 | Schroeder, Jr. | 244/130 |
| 3,902,944 | 9/1975 | Ashton et al. . | |
| 3,937,778 | 2/1976 | Tanaka . | |
| 3,962,506 | 6/1976 | Dunahoo . | |
| 4,053,122 | 10/1977 | Gar . | |
| 4,132,755 | 1/1979 | Johnson . | |
| 4,169,749 | 10/1979 | Clark . | |
| 4,429,844 | 2/1984 | Brown et al. | 244/219 |
| 4,471,925 | 9/1984 | Kunz . | |
| 4,565,595 | 1/1986 | Whitener . | |
| 4,567,007 | 1/1986 | Harder . | |
| 4,816,106 | 3/1989 | Turris et al. . | |
| 4,838,502 | 6/1989 | Pinson | 244/130 |
| 4,865,275 | 9/1989 | Thompson . | |
| 5,071,092 | 12/1991 | Williams et al. | 244/130 |
| 5,222,699 | 6/1993 | Albach et al. | 244/213 |
| 5,350,136 | 9/1994 | Prosser et al. | 244/129.4 |
| 5,522,566 | 6/1996 | Hardy | 244/130 |

FOREIGN PATENT DOCUMENTS

840739 5/1939 France .

Primary Examiner—Virna Lissi Mojica
Attorney, Agent, or Firm—Terry J. Anderson; Karl J. Hoch, Jr.

[57] ABSTRACT

An expandable section (12) is provided for an aircraft (10) which includes a movable rigid aircraft section (18) which is attached to the fixed aircraft structure (16) by an elastomeric transition section (14) which permits the movable aircraft section (18) to move between a retracted configuration and an expanded configuration to increase the volume of a cavity within the aircraft. The elastomeric transition section includes elastomeric material (20) having a plurality of holes (22) therethrough. Flexible rods (28, 32) are secured either to the aircraft structure (38) or the movable aircraft section (18) and extend through the holes to permit the elastomeric transition section to expand, contract and bend as necessary to accommodate the movement of the movable aircraft section (18). In one application, the movable aircraft section (18) can form the doors (40, 42) of a weapons bay. A number of hinge mechanisms are disclosed for opening and closing the weapons bay doors independent of movement of the doors between the retracted and expanded positions.

13 Claims, 11 Drawing Sheets

EXPANDABLE AIRCRAFT SECTION

TECHNICAL FIELD OF THE INVENTION

This invention relates to an improved aircraft structure, and in particular to a design to permit an increase in the volume of an internal cavity within an aircraft on a selected basis.

BACKGROUND OF THE INVENTION

In designing an aircraft, the designer is often confronted with design criteria which work against each other and force the designer to make numerous compromises in the aircraft design. For example, the aircraft is designed to carry a maximum payload, necessitating commensurate power and strength even though the aircraft may frequently carry a lesser load. Also, the aircraft design must include the largest internal spaces therein possible to, for example, contain large munitions, requiring a larger aircraft with greater drag forces while the aircraft may frequently carry smaller munitions.

One common solution to this quandary has often been simply suspending munitions from the bottom of the wings of the aircraft, permitting a wide range of munitions to be accommodated. However, each munition contributes to the overall drag on the aircraft.

When munitions are carried within the aircraft itself, the volume of the munitions are necessarily limited by the volume of the cavity within the aircraft designed to accept them. However, with the wide range of munitions available, both in volume and size, it has been necessary in the past to design the volume of the munitions bay to accept the largest munition for which the aircraft is designed. The size of the bomb bay necessarily affects the size of the aircraft, its weight and efficiency. When smaller munitions are carried by the aircraft, a portion of the bomb bay is empty, resulting in an inefficiency in the aircraft system.

SUMMARY OF THE INVENTION

In accordance with one aspect of the present invention, an expandable aircraft section is provided in an aircraft which includes a rigid stationary aircraft portion which defines an enclosed cavity. A rigid movable aircraft portion is provided which forms a closure for the cavity. An elastomeric transition section is attached between the rigid stationary aircraft portion and the rigid movable aircraft portion permitting the rigid movable aircraft portion to move relative the rigid stationary aircraft portion between a contracted position and an expanded position increasing the volume of the cavity. In accordance with another aspect of the present invention, the elastomeric transition section includes elastomeric material having holes formed therethrough and a plurality of flexible rods. Each of the rods pass through one of the holes. Selected ones of the rods are secured to the rigid stationary aircraft portion while the others of said rods are secured to the rigid movable aircraft portion.

In accordance with another aspect of the present invention, the cavity is a weapons bay and the rigid movable aircraft portion is a weapon bay door. Hinge structure is mounted between the aircraft portions to move the rigid movable aircraft portion between a closed position and an open position independent of the orientation of the movable aircraft portion relative to the stationary aircraft portion.

BRIEF DESCRIPTION OF THE DRAWINGS

For a more complete understanding of the present invention, and for further advantages thereof, reference is now made to the following description, taken in conjunction with the accompanying drawings, in which.

DETAILED DESCRIPTION

Figures 1, 2:
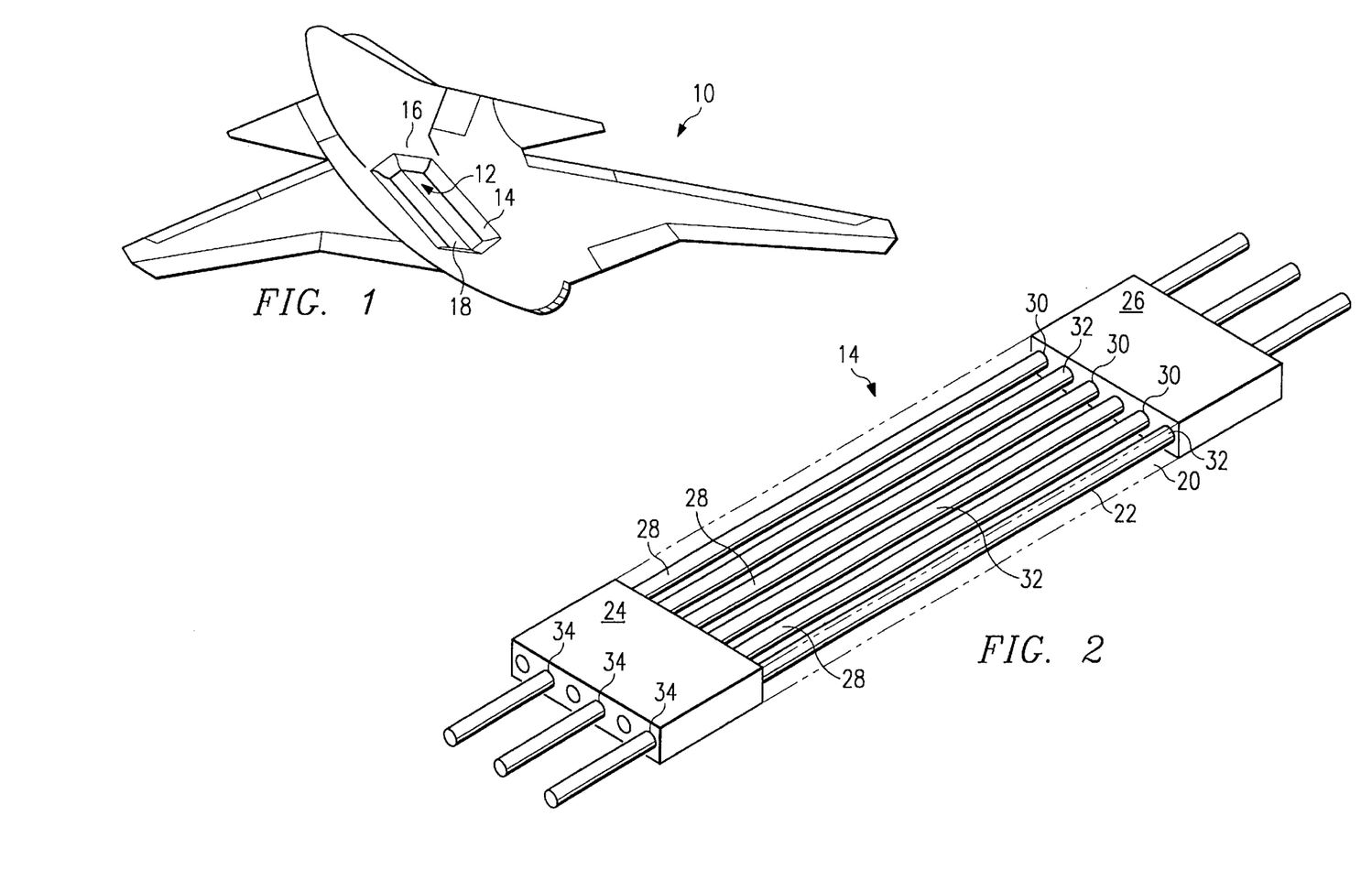
FIG. 1 is a perspective view of an aircraft incorporating a first embodiment of the present invention.
FIG. 2 is a perspective view of an elastomeric transition section forming a portion of the present invention.
Figure 3:
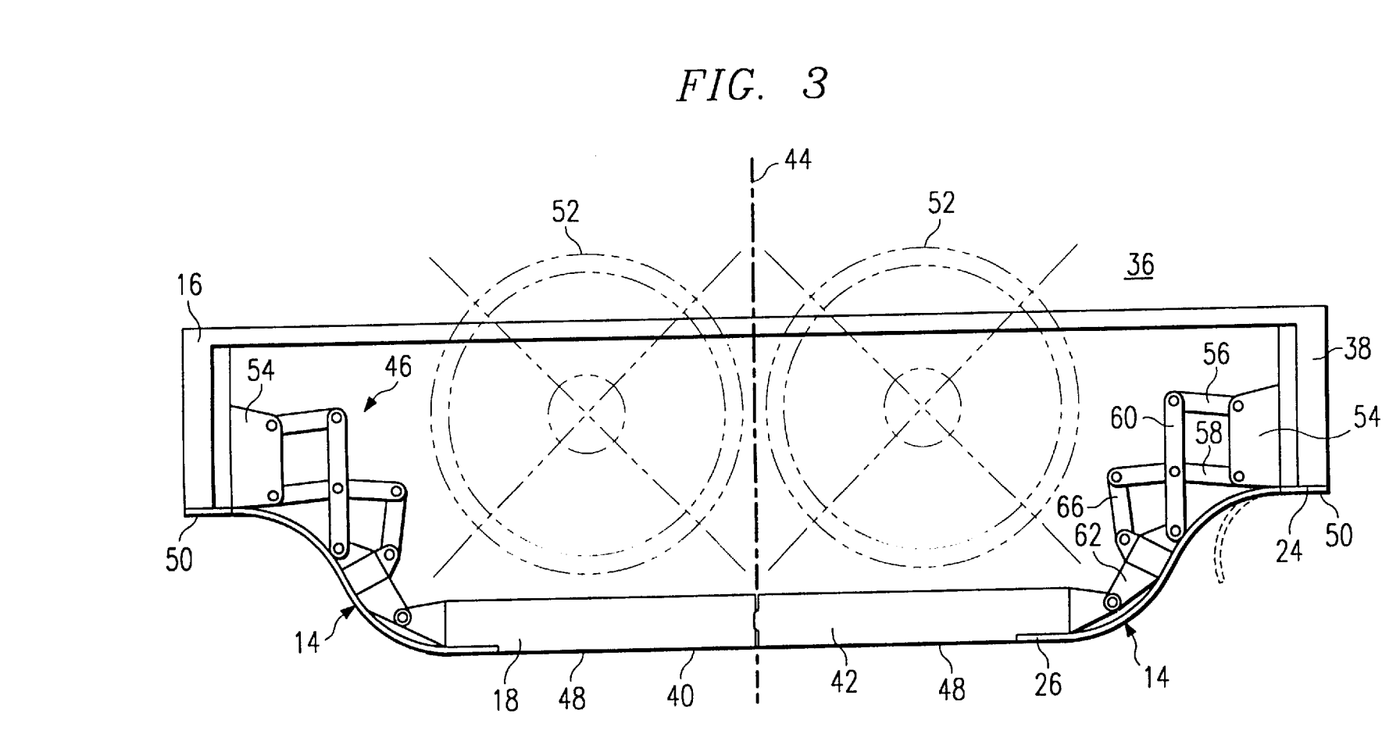
FIG. 3 is a cross-sectional view of a weapons bay showing a first hinge mechanism of the present invention.

With reference now to the accompanying drawings, wherein like or corresponding parts are designated by the same reference numeral, and with specific reference to FIGS. 1–3, an aircraft 10 is disclosed which incorporates an expandable section 12 which permits the volume of a cavity within the aircraft 10 to be enlarged. The expandable section 12 includes an elastomeric transition section 14 which extends from a rigid nonmovable aircraft section 16 to a movable rigid aircraft section 18. The elastomeric transition section 14 permits the movable aircraft section 18 to move between an expanded position, as seen in FIG. 1, where the volume of the cavity within the aircraft is increased, to a contracted position with the surface of the movable aircraft section 18 flush with the adjacent surfaces of the nonmovable aircraft section 16 and the intervening elastomeric transition section 14.

With specific reference to FIG. 2, the elastomeric transition section 14 can be seen to include an elastomeric material 20 which has a plurality of holes 22 formed therethrough. A first end of the elastomeric material 20 is formed to a rigid support block 24 while the other end is formed to a rigid support block 26. A plurality of rods 28 are mounted at one end in the support block 24 and extend through holes 22 to either proximate the support block 26 or actually through the support block 26 as seen in FIG. 2 through holes 30 formed in the block 26. Rods 28 can slide within holes 30. Similar rods 32 are secured at one end to support block 26 and extend through holes 22 to either proximate to the support block 24 or through the support block through holes 34 formed therein. Rods 32 can slide within holes 34.

A transition section of this type is disclosed and claimed in U.S. Pat. No. 5,222,699, issued Jun. 29, 1993 to Walter C. Alboch and Kenneth J. Fewel, which patent is hereby incorporated by reference herein in its entirety.

Rigid support block 24 is secured to the nonmovable rigid aircraft section 16 by suitable fasteners, such as bolts, rivets or the like. The rigid support block 26 is attached to the movable rigid aircraft section 18 by similar fasteners. The elasticity of the elastic material 20, the sliding of the rods 28 through holes 30 and rods 32 through holes 34 and the flexibility of the rods 28 and 32, permit the section 14 to bend and elongate or compress as necessary to permit the movable rigid aircraft section 18 to move between the retracted and expanded positions. Therefore, the volume of a cavity within the aircraft, for which the movable rigid aircraft section 18 and surrounding elastomeric transition section 14 form some portion of the wall or boundary thereof, can effectively be enlarged by moving the rigid aircraft section 18 to the expanded position, with the elastomeric transition section 14 stretching and deforming to accommodate the necessary movement while maintaining a smooth aerodynamic outer configuration which does not significantly increase the drag on the aircraft. The elastomeric transition section 14 is continuous, therefore avoiding any sharp edges or discontinuities which may increase air flow resistance.

In the preferred embodiment, the rods are flexible, and are made of material such as pultruded fiberglass, such as astroquartz, S2 fiberglass or quartz fiberglass, or graphite, steel or aluminum. The elastomer is preferably a silicon, such as a Dow Corning room temperature vulcanizing silicon rubber. One specific elastomer suitable for this construction would be the 6121 elastomer sold by Dow Corning.

With reference to FIG. 3, one application of this principal can be seen to be applied to a weapons bay 36 with aircraft structure 38 forming the rigid aircraft section 16 and a pair of weapons bay doors 40 and 42 forming the movable rigid aircraft section 18. It can be seen that the inner edges of the doors 40 and 42 intersect along a line 44 bisecting the center line of the weapons bay 36.

A hinge mechanism 46 is provided which works in cooperation with the elastomeric transition section 14 to permit the doors 40 and 42 to move between the retracted position, where the surfaces 48 of the doors are coplanar with the surfaces 50 of the aircraft structure 38, to the expanded position, as seen in FIG. 3, where surfaces 48 remain parallel to surfaces 50 but are spaced therefrom to effectively enlarge the volume of the weapons bay 36 to carry larger weapons 52. The hinge mechanism 46 also has the advantage of maintaining the intersection between the doors along the line 44 in the contracted position and expanded position.

The hinge mechanism 46 includes a bracket 54 secured on the fixed aircraft structure 38 on either side of the weapons bay and first and second links 56 and 58 pivoted to the upper and lower portion of the brackets, respectively. A third link 60 is pivoted at its upper end to the end of the first link 56 and at its middle to the middle of the second link 58, and at its lower end to a bracket 62 near an end of the bracket. The second link 58 is pivoted to the upper end of a fourth link 66. The fourth link 66 is pivoted at its lower end near the center of the bracket 62. The lower end of bracket 62 is pivoted to the outer edge of the doors 40 and 42. As can be understood, the hinge mechanism 46 maintains the doors parallel and centered on line 44 in the retracted and expanded positions.

Figure 4:
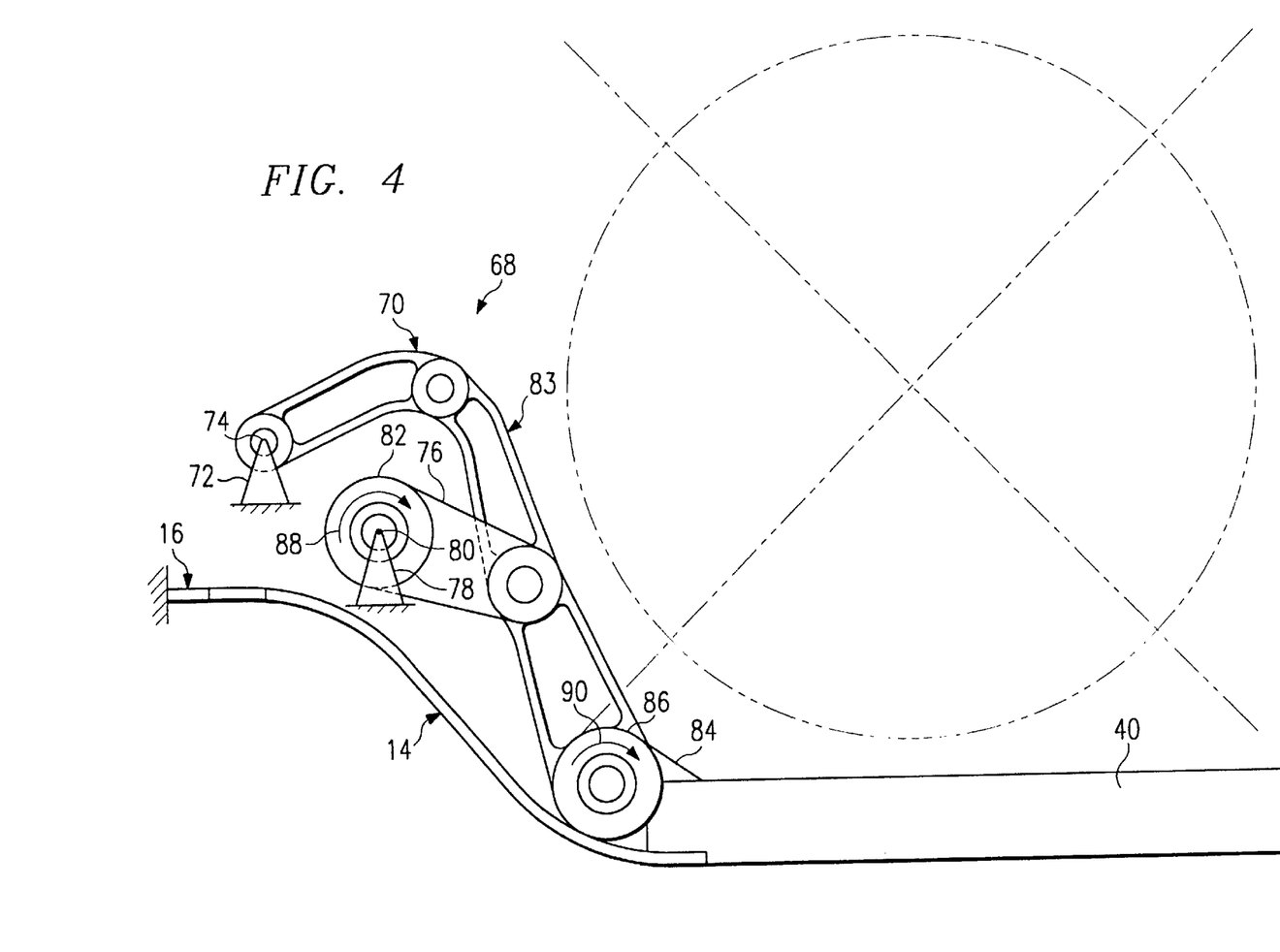
FIG. 4 is a partial cross-section of a weapons bay illustrating a second version of a hinge mechanism of the present invention.

With reference now to FIG. 4, a hinge mechanism 68 forming a first modified hinge mechanism is illustrated. The hinge mechanism includes a first link 70 which is mounted at its outer end to a support 72 on the fixed aircraft structure for pivotal motion about an axis 74. A second link 76 is pivoted at one end to a support 78 on the fixed aircraft structure for pivotal motion about axis 80. A rotary actuator 82 is mounted on the fixed aircraft structure for rotating the second link 76 about axis 80. The other end of the second link 76 is pivoted to approximately the center point of a third link 83. Third link 83 is also pivoted at its upper end to first link 70. A fourth link 84 is pivoted at one end to the lower end of the third link 83 and is secured to the weapons bay door 40. A rotary actuator 86 is mounted thereon to rotate the fourth link 84 relative to the third link 83.

The doors 40 and 42 can be moved to the expanded position by actuating rotary actuator 82 to rotate second link 76 in the direction of arrow 88 in FIG. 4 while simultaneously actuating rotary actuator 86 in the direction opposite the direction of arrow 90. When the doors 40 and 42 are to be opened, the rotary actuator 86 is operated to rotate link 84 in the direction of arrow 90 while rotary actuator 82 simultaneously rotates in the direction of arrow 88 to open the doors. To move the doors from the expanded position to the retracted position, it is necessary to actuate rotary actuator 82 in the direction opposite arrow 88 and actuate rotary actuator 86 in the direction of arrow 90. To close the doors 40 and 42 from a full open position, it is necessary to operate the actuator 86 in the direction opposite arrow 90 and operate actuator 82 in the direction opposite arrow 88.

Figure 5A:
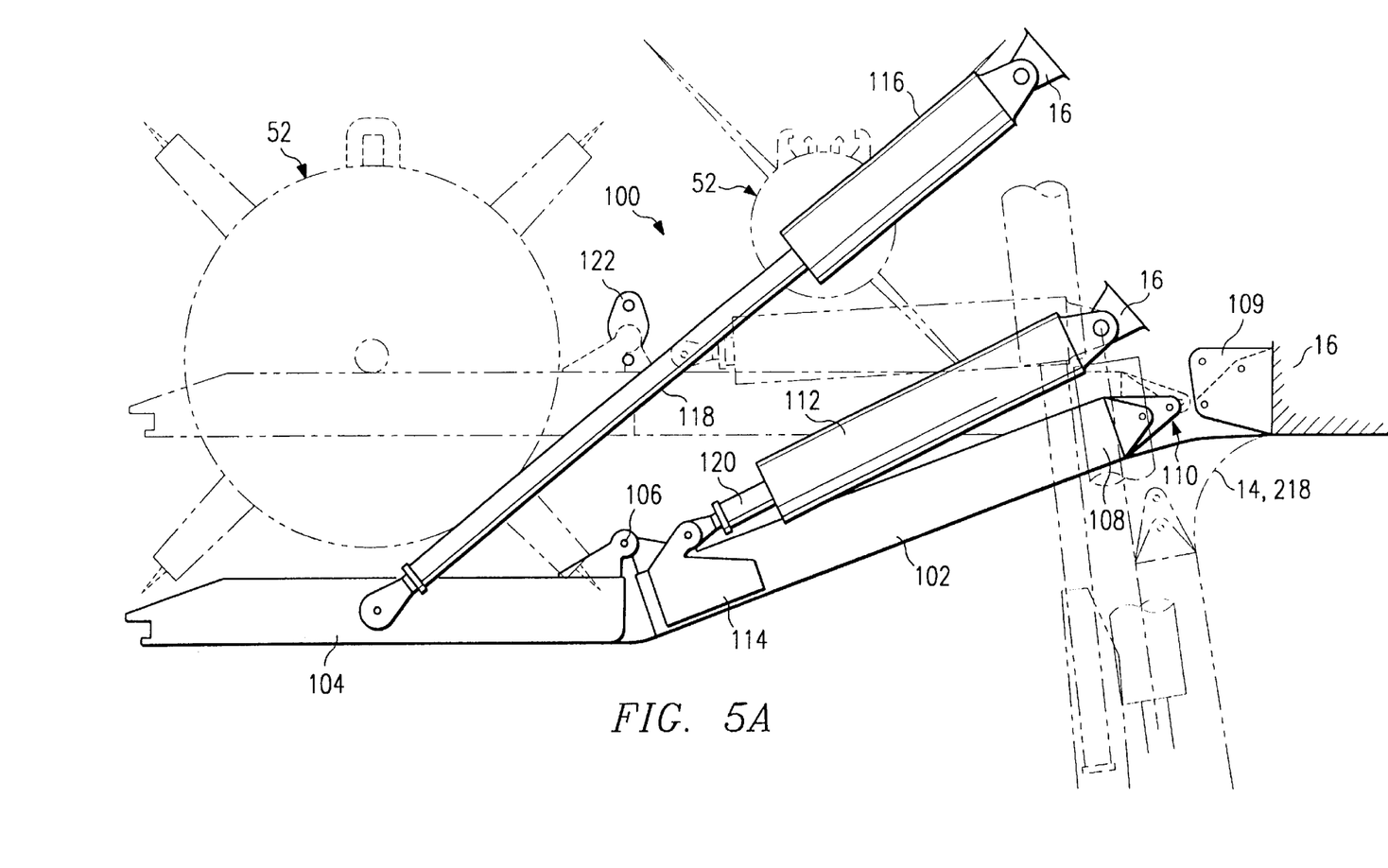
FIGS. 5A–5G are partial cross-sectional views of a weapons bay showing a third version of a hinge mechanism of the present invention.
Figure 5B:
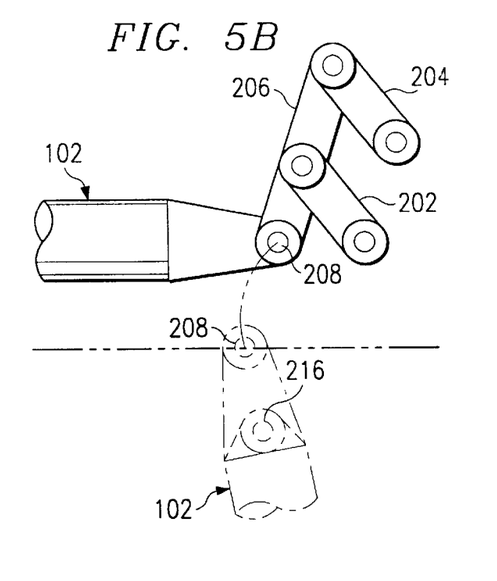
Figure 5C:
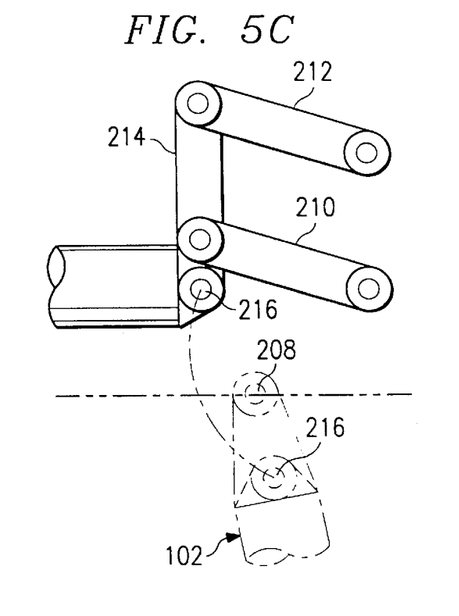
Figure 5D:
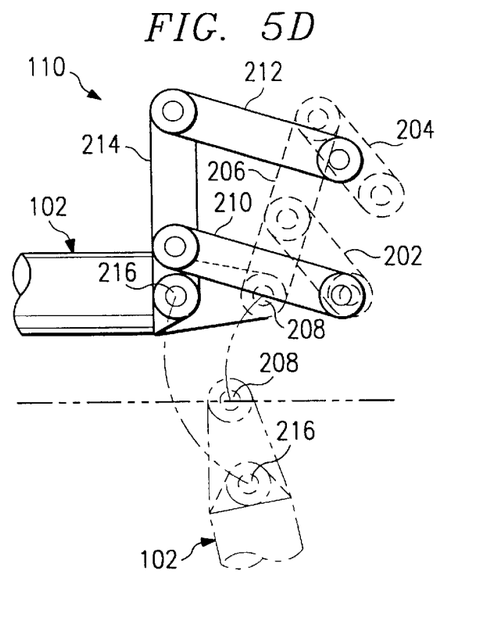
Figure 5E:
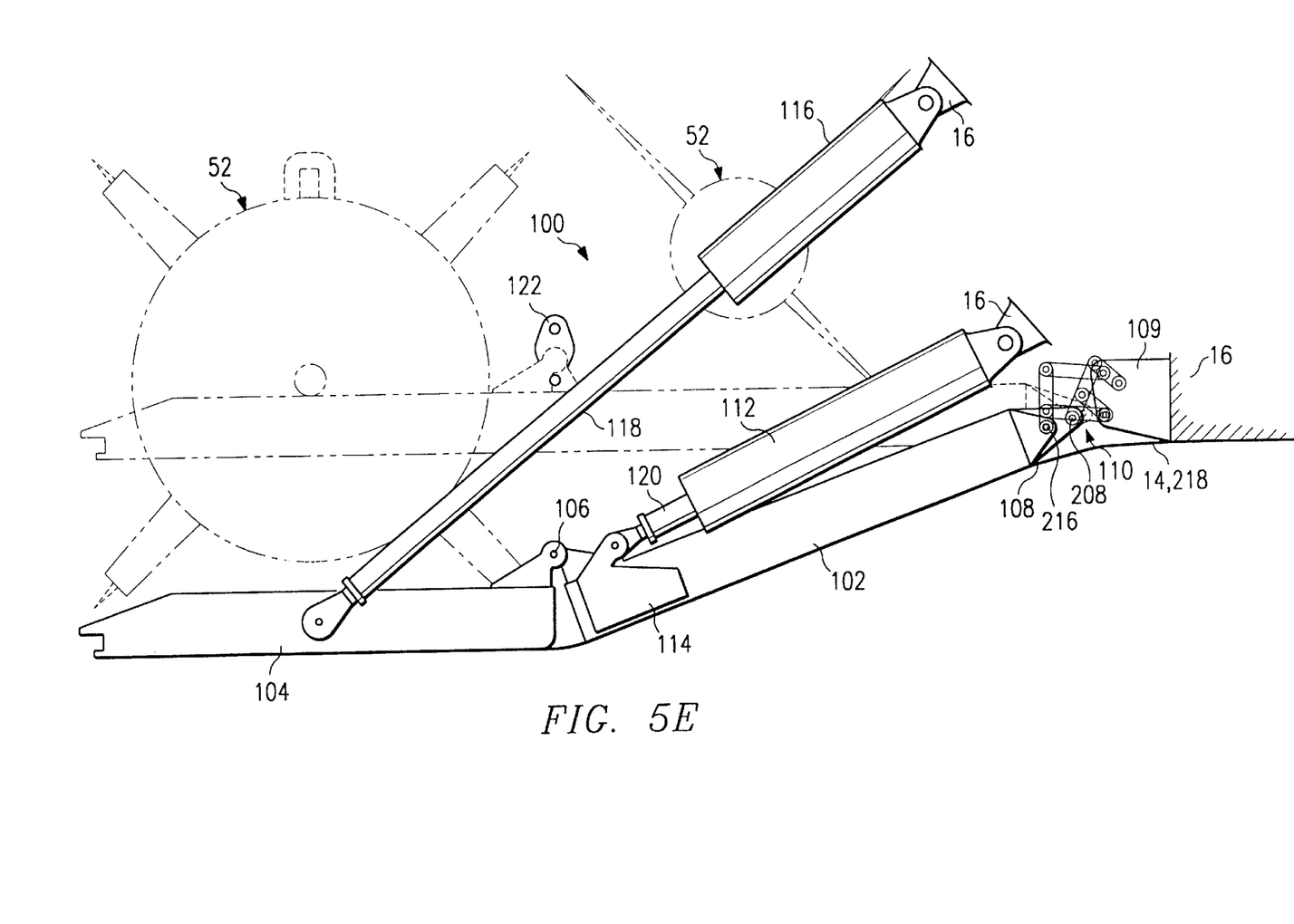
Figure 5F:
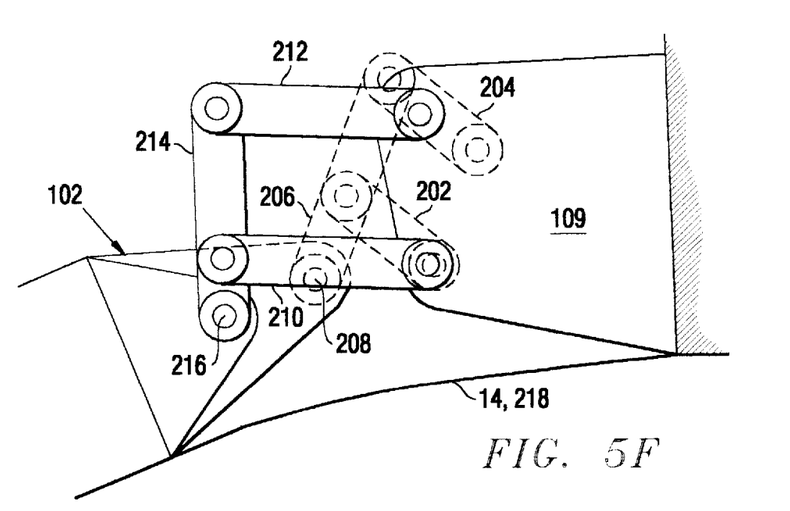
Figure 5G:
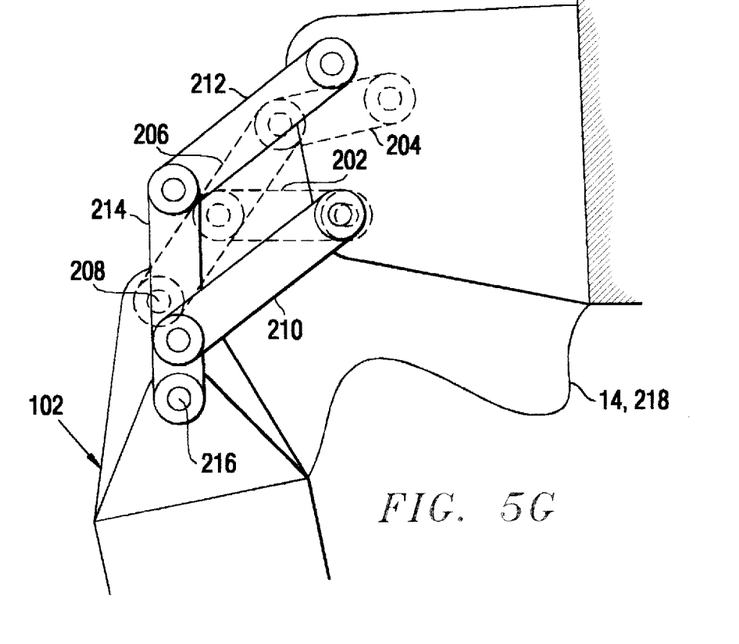

FIGS. 5A–5G illustrate a kinematic mechanism 100 forming a second modification of the present invention. In mechanism 100, each door is formed of an outer half 102 and an inner half 104 pivoted together at hinge 106. The outward edge 108 of the outer half 102 is hinged at hinge link assembly 110 to bracket 109 fixed on the aircraft structure 16. A first double-acting cylinder 112 is mounted between the fixed aircraft structure and the inner end 114 of the outer half 102. A second double-acting cylinder 116 is secured between the aircraft structure and the inner half 104. To move the door to the closed and retracted position (shown in dotted line in FIG. 5E), the cylinder 116 is actuated to retract the piston 118 thereof while the piston 120 in the first double-acting cylinder 112 is retracted completely within the cylinder. To move the door to the closed but extended position (shown in solid line in FIG. 5E and in FIG. 5F), the pistons 118 and 120 are extended. To open the door completely (shown in FIG. 5G), the piston 120 is extended further and the piston 118 is retracted, which causes the outer and inner door halves to fold against each other in the opened position as seen in FIG. 5A.

The outer half 102 is hinged though a link assembly 110 to the rigid aircraft structure. The link assembly 110 includes two sets of linkages, with the first set (FIGS. 5B and 5D) including links 202, 204 and 206. The link 206 in the first set is hinged at hinge 208 on the outboard extremity of the outer half 102. The second set (FIGS. 5C and 5D) includes links 210, 212 and 214 which are pivoted between the aircraft structure and a hinge 216 spaced inboard from hinge 208. The links 202 and 204 are parallel, with their outer ends pivoted to the bracket 109 on aircraft structure 16 and their inner ends pivoted to the middle and upper end of link 206, respectively. The lower end of link 206 is pivoted to hinge 208. Links 210 and 212 are parallel, with their outer ends pivoted to the aircraft structure and their inner ends pivoted to the upper end of link 214 and a position spaced upward from the lower end of the link 214, respectively. The lower end of link 214 is pivoted to outer half 102 at hinge 216. The hinge assembly drives the doors through a motion such that the elastomeric transition section 14 can be replaced, if desired, by a skin 218 attached between the rigid aircraft structure and the outer half 102 because the skin would neither be compressed nor elongated, but would rather be put in pure bending through the motion of the link assembly 200. The skin 218 could, for example, be formed by thin metal, such as aluminum or steel or a flexible composite.

A door uplock 122 is mounted on the fixed aircraft structure to engage the hinge 106 and to secure the doors in the retracted position.

With reference now to FIGS. 6–10, a hinge mechanism 130 forming a fourth modification of the present invention is illustrated. The linkages of hinge mechanism 130 are the same as hinge mechanism 46 except for the lengths of the links. Again, the doors 40 and 42 are formed of two parts, an outer half 132 and an inner half 134 pivoted together at hinges 136. A support bracket 138 is mounted to the aircraft structure 16 and pivotally mounts a first link 140 near its upper end and a second link 142 near its lower end. A third link 144 is pivoted at its upper end to the inner end of the first link 140 and at its middle to the middle of the second link 142. The inner end of the outer half 132 is hinged to the lower end of the third link 144. A fourth link 146 is pivoted at its middle to the inner end of the second link 142 and at its upper end to a piston 148 of a double-acting cylinder 150. The cylinder 150 is, in turn, pivotally mounted to the fixed aircraft structure at hinge 152.

Figure 6:
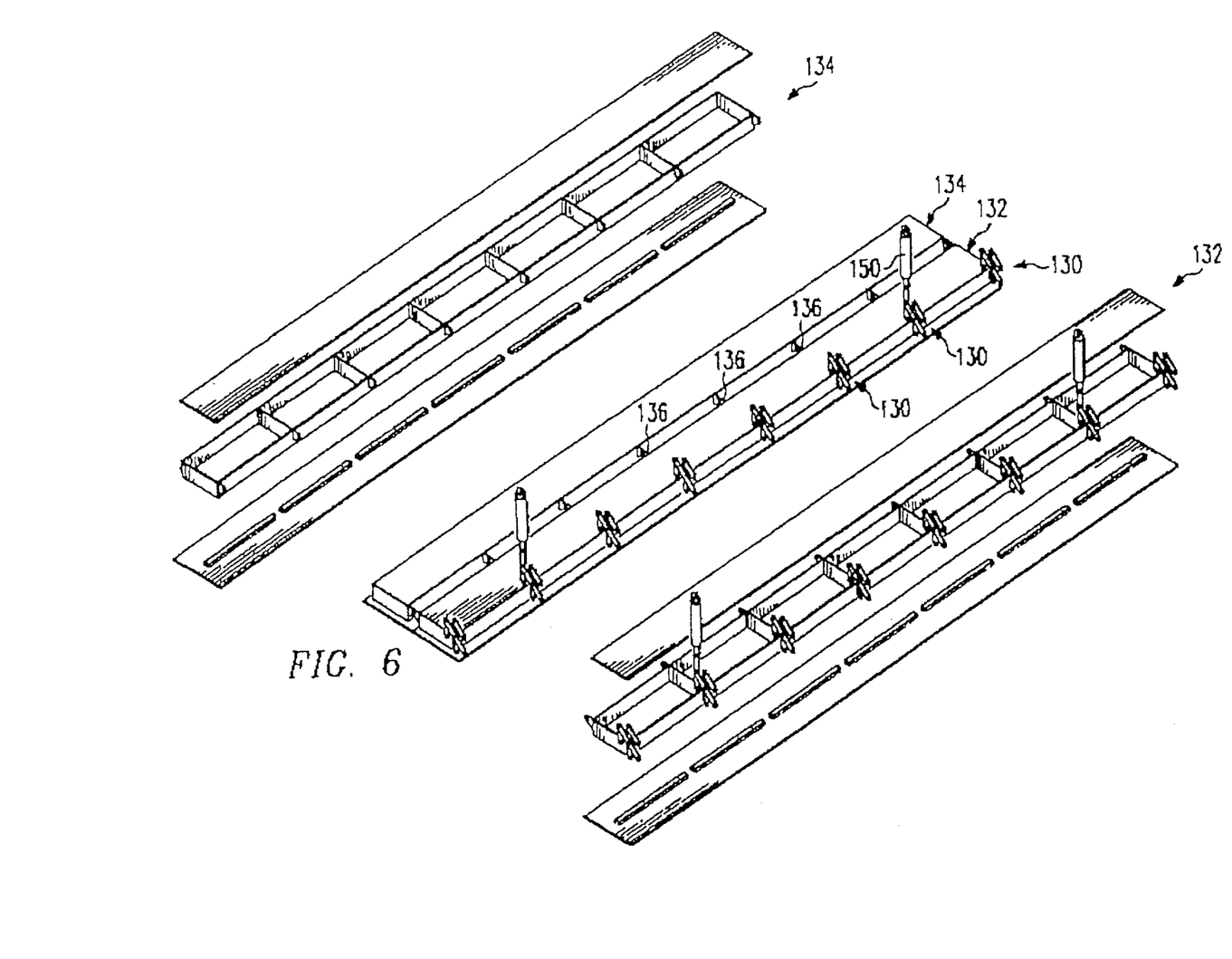
FIG. 6 is an exploded view of a portion of a weapons bay showing a structural arrangement of components.

This unique kinematic arrangement of the links 140, 142, 144 and 146, and their connection to the door 132 provide for pure bending only of the continuous skin formed by elastomeric transition section 14 and thus a skin 218 made of composite or metal material can be substituted for section 14 since no elongation is induced by the hinge mechanism.

Figure 7:
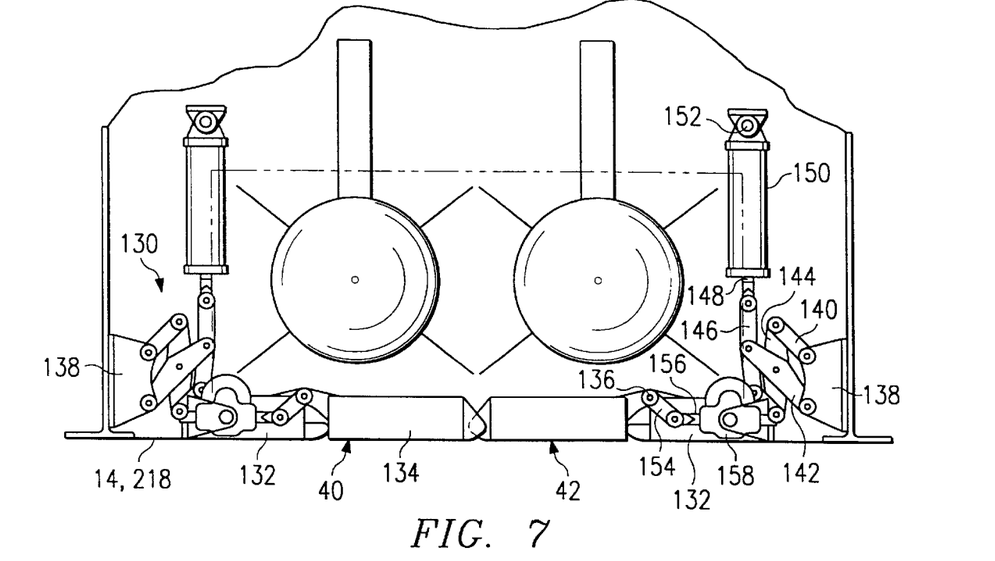
FIG. 7 is a cross-sectional view of the weapons bay of FIG. 6 showing the weapons bay doors in the closed position and the doors in the retracted configuration.

The lower end of the fourth link 146 is hinged to the outer half 132 at a position spaced slightly inward of the third link 144. The hinge 136 is formed of a crank arm 154 which is pivoted near its middle to the outer half 132 and secured at its inner end on the inner half 134. The outer end of the crank arm is pivotally mounted to the end of a piston 156 forming part of a double-acting cylinder 158 mounted on outer half 132. FIG. 7 illustrates the doors 40 and 42 in the closed position and retracted position. In this position, both pistons 148 and 156 are fully retracted.

Figure 8:
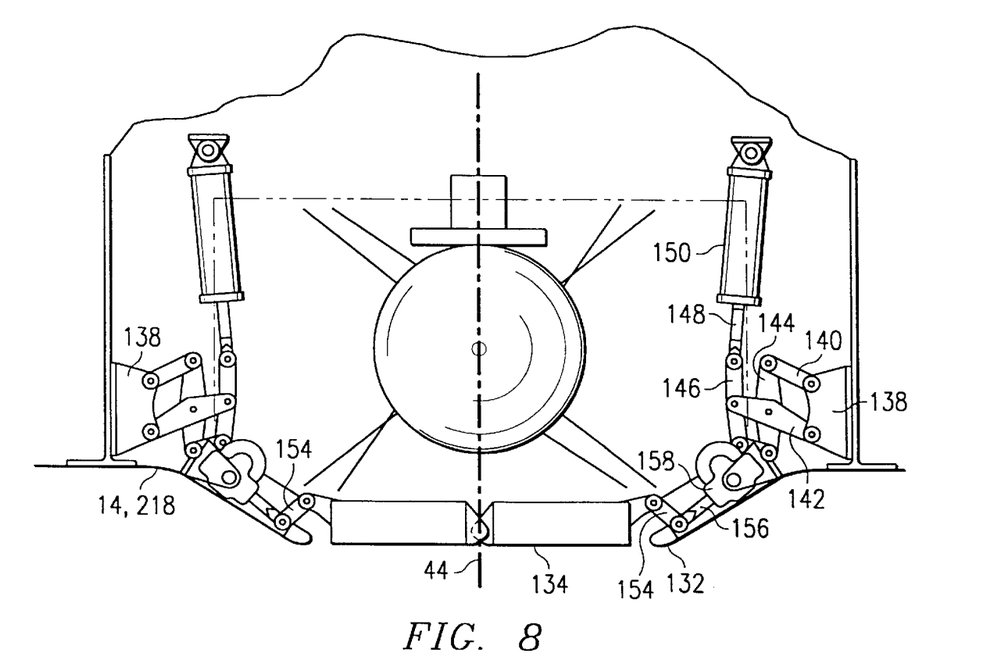
FIG. 8 is a cross-sectional view of the weapons bay of FIG. 6 showing the weapons bay doors in the closed position and expanded to increase the weapons bay volume.

As seen in FIG. 8, the doors are moved to the expanded position by partially extending the piston 148 and fully extending piston 156 as illustrated. As noted previously, the intersection of the doors 40 and 42 lie continuously along the line 44 bisecting the weapons bay.

The opening at the intersection of doors 132 and 134 can be closed with a metallic seal permanently attached to door 134 and allowed to slide on a radiused portion of door 132. It may also be sealed with the aforementioned transition section attached to doors 132 and 134.

Figure 9:
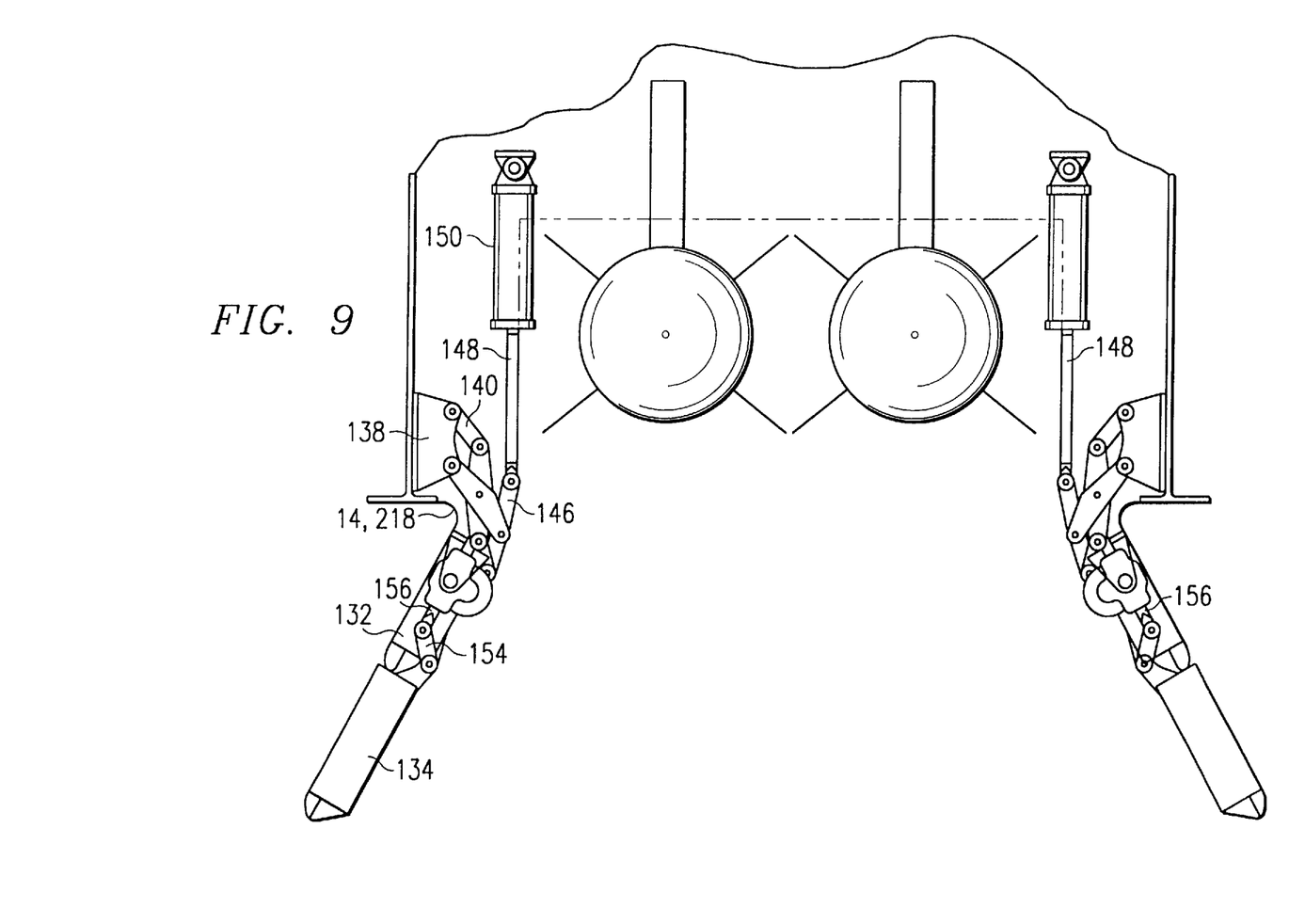
FIG. 9 is a cross-sectional view of the device in FIG. 6 showing the weapons bay doors open.

With reference to FIG. 9, fully extending the piston 148 while retracting the piston 156 will cause the doors 40 and 42 to be moved to the fully opened position for release of the weapons.

Figure 10:
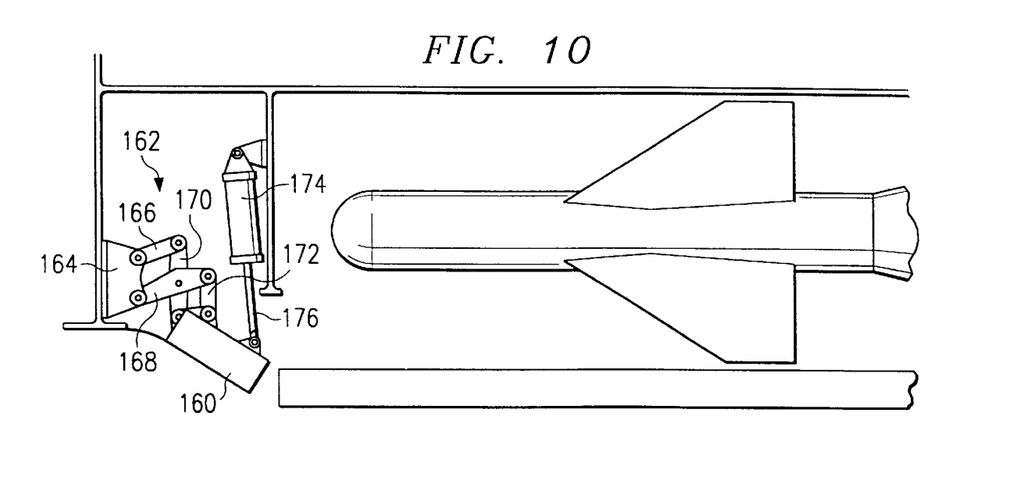
FIG. 10 is a cross-sectional view of the device in FIG. 6 showing the forward weapons bay door portion.

FIG. 10 illustrates a forward ramp 160 and hinge mechanism 162 permitting it to open and close while expanding and contracting. The hinge mechanism 162 includes a bracket 164 with a first link 166 pivoted to the upper end thereof and a second link 168 pivoted to the lower end thereof. A third link 170 is pivoted at its upper end to the first link and near its middle to the second link. The bottom end of the third link 170 is pivoted to the inboard end of the ramp 160. A fourth link 172 is pivoted at the end of the second link 168 and to the ramp 160. A double-acting actuator 174 has the piston 176 thereof hinged at the exposed end of the ramp 160. The actuator 174 will pivot the ramp between the open and closed positions while the hinge mechanism will permit the ramp to move between the expanded configuration and contracted configuration.

Figure 11:
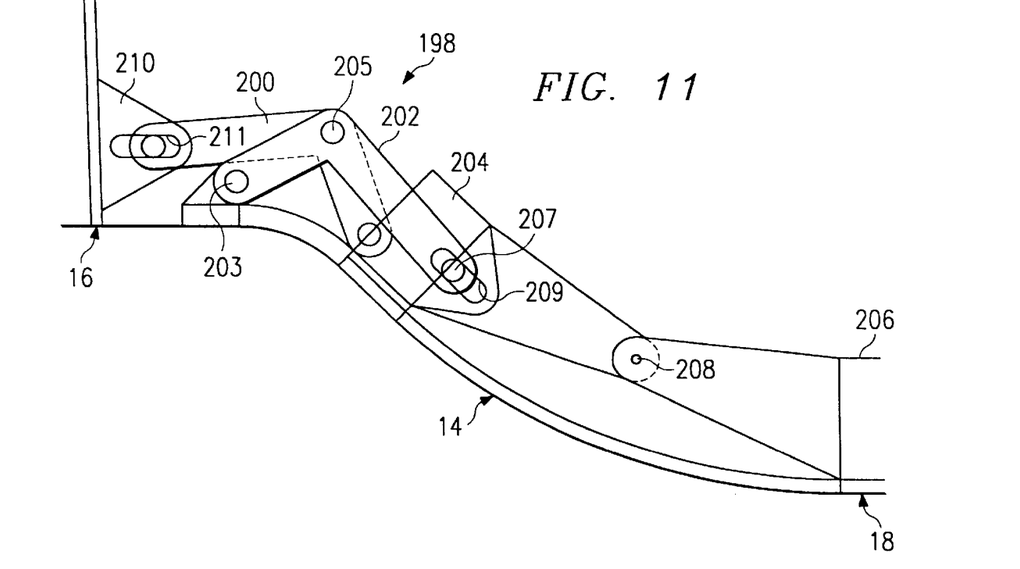
FIG. 11 is a cross-sectional view of a fourth version of a hinge mechanism.

With reference to FIG. 11, a hinge mechanism 198 is illustrated. The hinge mechanism has a support bracket 210 mounted on the aircraft structure. A first link 200 is pivoted at one end to the bracket 210 in a manner to allow limited sliding movement along slot 211 in bracket 210. The opposite end of link 200 is pivoted to outboard door 204. A second link 202 is pivoted to the aircraft structure at hinge 203, and to first link 200 at hinge 205 near the middle of both links. The opposite end of second link 202 is pivoted to outboard door 204 at hinge 207 for limited sliding movement along slot 209 in door 204. The outboard door 204 is connected through rotation point 208 to the inboard door 206.

Although several embodiments of the invention have been illustrated in the accompanying drawings and described in the foregoing Detailed Description, it will be understood that the invention is not limited to the embodiments disclosed, but is capable of numerous rearrangements, modifications and substitutions of parts and elements without departing from the spirit and scope of the invention.

We claim:

1. An expandable aircraft section, comprising:
   a rigid stationary aircraft portion defining an enclosed cavity having a perimeter;
   a rigid movable aircraft portion forming a closure of the cavity;
   an elastomeric transition section attached between the rigid stationary aircraft portion and the rigid movable aircraft portion about the entire perimeter of the cavity of the rigid stationary aircraft portion for permitting the rigid movable aircraft portion to move relative the stationary aircraft portion between a contracted position and an expanded position to increase the volume of the cavity.

2. The expandable aircraft section of claim 1, wherein the elastomeric transition section includes elastomeric material having holes formed therethrough and a plurality of flexible rods, each of said rods passing through one of the holes, selected ones of said plurality of rods secured to the rigid aircraft portion and the others of said plurality of rods secured to the movable aircraft portion.

3. An expandable aircraft section, comprising:
   a rigid stationary aircraft portion defining an enclosed cavity;
   a rigid movable aircraft portion forming a closure of the cavity;
   an elastomeric transition section attached between the rigid stationary aircraft portion and the rigid movable aircraft portion permitting the rigid movable aircraft portion to move relative the stationary aircraft portion between a contracted position and an expanded position to increase the volume of the cavity;
   wherein the rigid stationary aircraft portion forms a weapons bay and the rigid movable aircraft portion forms a weapons bay door.

4. The expandable aircraft section of claim 3, further including a hinge mechanism for moving the weapons bay door between a closed and open position, said hinge mechanism accommodating movement of the movable aircraft portion between the contracted position and the expanded position.

5. The expandable aircraft section of claim 2, wherein the rods are formed from a material selected from the group consisting of fiberglass, steel, aluminum and graphite.

6. The expandable aircraft section of claim 5, wherein when fiberglass is selected, the fiberglass is selected from the group consisting of quartz fiberglass and S2 fiberglass.

7. The expandable aircraft section of claim 2, wherein the elastomeric material is a room temperature vulcanizing silicon rubber.

8. A fairing for an expandable aircraft bomb bay, the bomb bay having at least one bomb bay door extending along a side edge of the bomb bay, said fairing comprising:

a rigid member having an aerodynamic surface;

a mechanism to attach the rigid member to the aircraft and move the rigid member between a retracted position and an expanded position relative the aircraft; and an elastomeric transition section attached between the rigid member and the aircraft at an edge of the bomb bay extending at an angle relative the side edge.

9. The fairing of claim 8 for use in an expandable aircraft bomb bay having a front, wherein the fairing is at the front of the bomb bay.

10. The fairing of claim 8 wherein the fairing is a faceted fairing.

11. The fairing of claim 8 wherein the elastomeric transition section defines a smooth aerodynamic outer configuration between said edge of the bomb bay extending at an angle relative the side edge and the aerodynamic surface of the rigid member when the rigid member is in the retracted position, expanded position, and moving between said positions.

12. The fairing of claim 8 wherein the mechanism includes a double-acting actuator attached between the rigid member and the aircraft.

13. The fairing of claim 8 wherein the mechanism includes a hinge mechanism attached between the rigid member and aircraft.

* * * * *